United States Patent
Engelhardt et al.

(10) Patent No.: US 8,242,753 B2
(45) Date of Patent: Aug. 14, 2012

(54) CURRENT LIMITATION FOR A DOUBLE-FED ASYNCHRONOUS MACHINE

(75) Inventors: Stephan Engelhardt, Sonsbeck (DE); Andrzej Geniusz, Kempen (DE)

(73) Assignee: Woodward SEG GmbH & Co KG, Kempen (DE)

( * ) Notice: Subject to any disclaimer, the term of this patent is extended or adjusted under 35 U.S.C. 154(b) by 504 days.

(21) Appl. No.: 12/304,369

(22) PCT Filed: May 30, 2007

(86) PCT No.: PCT/EP2007/055272
§ 371 (c)(1), (2), (4) Date: Dec. 11, 2008

(87) PCT Pub. No.: WO2007/144267
PCT Pub. Date: Dec. 21, 2007

(65) Prior Publication Data
US 2009/0267572 A1    Oct. 29, 2009

(30) Foreign Application Priority Data
Jun. 12, 2006   (DE) .................. 10 2006 027 465

(51) Int. Cl.
  *H02P 9/00* (2006.01)
  *H02P 11/00* (2006.01)
(52) U.S. Cl. .......................... 322/20; 322/44
(58) Field of Classification Search .......... 322/44, 322/20, 89, 59; 290/7, 44, 55; 700/286, 700/297
See application file for complete search history.

(56) References Cited

U.S. PATENT DOCUMENTS

| | | | | |
|---|---|---|---|---|
| 4,621,198 A | * | 11/1986 | Roberge et al. | 307/82 |
| 6,567,282 B1 | * | 5/2003 | Kikuchi et al. | 363/37 |
| 2003/0052643 A1 | * | 3/2003 | Sweo | 318/801 |
| 2004/0027095 A1 | * | 2/2004 | Wobben | 322/20 |
| 2007/0052394 A1 | * | 3/2007 | Geniusz | 323/205 |
| 2011/0112697 A1 | * | 5/2011 | Arinaga et al. | 700/287 |
| 2011/0153092 A1 | * | 6/2011 | Engelhardt et al. | 700/280 |

FOREIGN PATENT DOCUMENTS

| | | |
|---|---|---|
| GB | 2410 386 A | 7/2005 |
| GB | 2 411 252 A | 8/2005 |
| GB | 2411252 A * | 8/2005 |

OTHER PUBLICATIONS

H. Wrede: "Beiträge zur Erhöhung von Versorgungssicherheit und Spannungsqualität in der Übertragung und Verteilung elektrischer Energie durch Ieistungselektronische Betriebsmittel", Dissertation, Bochum, Germany 2003.

* cited by examiner

*Primary Examiner* — Julio Gonzalez
(74) *Attorney, Agent, or Firm* — Henry M. Feiereisen; Ursula B. Day

(57) ABSTRACT

In a method and an apparatus for controlling the output or drawn active and reactive power of a double-fed asynchronous machine (5), the maintenance of a maximum permissible current (16) of the machine—without the use of a subordinate current controller—is ensured by virtue of the fact that, during the operation of the double-fed asynchronous machine, a maximum permissible desired value for the active power (10*a*) to be output or to be drawn and a maximum permissible desired value for the reactive power (10*b*) to be output or to be drawn are calculated with the aid of a model of the asynchronous machine from the maximum permissible current (16), preferably corrected at least using the actual value of the current to be limited of the machine, in such a way that the maximum permissible current (16) is not exceeded. The predetermined active and reactive power desired values are then limited to the calculated maximum permissible values.

30 Claims, 3 Drawing Sheets

CURRENT LIMITATION FOR A DOUBLE-FED ASYNCHRONOUS MACHINE

The present invention concerns a method of and an apparatus for regulating the output or input active and reactive power of a double-fed asynchronous machine in which the current of the machine is to be limited.

A double-fed asynchronous machine is an asynchronous machine, the stator of which is generally operated with a voltage of constant amplitude and frequency and is connected for example to an electrical network. The rotor of a double-fed asynchronous machine is electrically connected by way of slip rings to a converter, preferably a pulse converter. In that way a voltage of variable amplitude and frequency can be impressed in the rotor. The double-fed asynchronous machine permits operation at a constant stator voltage or network voltage and a variable rotor speed. The converter can be actuated by a control unit in such a way that the active and reactive power output or input by the double-fed asynchronous machine can be regulated. The double-fed asynchronous machine is used for example in high-output wind power installations, as a wave generator or in connection with inertial mass storage means.

To protect the machine and the converter from thermal overloading a maximum permissible current may not be exceeded. In that respect a distinction is to be drawn between a maximum permissible static current and a maximum permissible dynamic current.

The maximum permissible static current can depend on various factors, for example the slip frequency of the machine, the ambient temperature or the switching frequency of the converter. The maximum permissible static current however also depends on cooling of the machine and the converter. With forced air cooling by a separate fan the permissible current can also depend on the fan voltage which generally corresponds to the network voltage.

In the case of systems with a permanent load it is sufficient to fix a maximum permissible static current. Systems with constantly changing loads generally involve the requirement of permitting a defined load application in order not to have to design the system for a permanent load corresponding to the maximum short-term load. In that case a current above the permissible permanent current is permitted for a short time. In general terms, in a simplification, it is assumed that the power losses and thus the thermal loading of the system increase in proportion to the square of the current. In order not to overload the system it is necessary to ensure that the mean value in respect of time of the square of the current does not exceed the square of the maximum permissible permanent current. A maximum permissible dynamic current is defined in that way.

Frequently a cascade structure for regulation is used for regulating the output or input active and reactive power of a double-fed asynchronous machine. In that case there is a respective regulator for active power and reactive power. The outputs of the power regulators represent the reference values of the current for subordinate current regulators. The reference values of the current are compared to the actual values. The difference signals form the input for the subordinate current regulators. Limitation of the current to a maximum permissible value, whether now it is a maximum permissible static current value or a maximum permissible dynamic current value, can be very easily implemented in such an arrangement by limitation of the outputs of the active and reactive power regulators. Such a regulating structure however has significant disadvantages: due to the cascade structure with the subordinate current regulators, restraints have to be accepted in respect of the dynamics. The dynamics can admittedly be improved by certain regulator structures, but such regulator structures place high demands on parameter compensation. Only a regulator structure which is carefully matched to the respective installation can improve the regulating dynamics.

By virtue of the above-described disadvantages, the aim, in respect of high-dynamic requirements, is to dispense with subordinate current regulators.

For that purpose it is basically conceivable for the current to be limited indirectly, more specifically by limiting the reference values of the output or input active and reactive power. For that purpose it would be conceivable to ascertain and use a characteristic curve with maximum permissible current values in respect of the output or input active and reactive power, in dependence on various influencing parameters. Such influencing parameters could be for example voltage, frequency or rotary speed. It will be noted however that the large number of other influencing parameters would inevitably lead to relatively great inaccuracies in the pre-calculated characteristic curves. The consequence of this would be that the currents in many operating conditions would have to be more severely limited than would be required to actually protect the installation. With such a protection concept therefore the converter and the machine would have to be designed for a correspondingly higher power in order always to ensure maintenance of the permissible values; it is however not possible to dispense with permanent maintenance of the permissible values in that way.

Therefore the object of the present invention is to reliably limit the current of a double-fed asynchronous machine whose output or input active and reactive power is regulated in such a way that the dynamics of power regulation are not influenced and the installation can be designed for the lowest possible power.

SUMMARY OF THE INVENTION

According to one aspect of the invention, the specified object is attained by a method of limiting a current of a double-fed asynchronous machine in which the output or input active and reactive power is regulated, and wherein during operation of the double-fed asynchronous machine a maximum permissible reference value of the active power to be output or input and a maximum permissible reference value of the reactive power to be output or input is calculated by means of a model of the asynchronous machine from the maximum permissible current in such a way that same is not exceeded and the predetermined active and reactive power reference values are limited to the calculated maximum permissible values.

With the solution according to the invention therefore subordinate current regulators are no longer required as the reference values of the output or input active and reactive power are limited and current limitation is thus effected indirectly. In contrast to the above-discussed solution involving characteristic curves the maximum permissible reference values of the output or input active and reactive power are not calculated in advance but calculated during operation of the double-fed asynchronous machine—preferably using a suitable feedback. In that way the maximum permissible reference values in respect of the output or input active and reactive power can be determined individually for the respective working point.

In a preferred embodiment of the invention in calculation of the maximum permissible reference values for the active and reactive power at least the actual value of the current to be limited is utilised for correction purposes.

In accordance with a preferred embodiment of the invention when specifying an active power priority firstly the maximum permissible reference value of the active power to be output or input is determined and the maximum permissible reference value of the reactive power to be output or input is determined in dependence on the reference value of the active power to be output or input. When specifying a reactive power priority firstly the maximum permissible reference value of the reactive power to be output or input is determined and the maximum permissible reference value of the active power to be output or input is determined in dependence on the maximum permissible reference value of the reactive power to be output or input.

When specifying an active power priority active power is produced as a matter of priority, that is to say the reactive power is firstly reduced. That priority is predetermined for example for drive train damping. When specifying a reactive power priority, reactive power is produced as a matter of priority, that is to say the active power is firstly reduced when there is an excessively high current. A reactive power priority is specified for example for voltage support.

Specifying an active or reactive power priority advantageously makes it possible to adapt the installation with a double-fed asynchronous machine to the respective conditions involved.

In accordance with a further preferred embodiment of the present invention a maximum permissible apparent power is ascertained by means of a simplified model of the double-fed asynchronous machine from the maximum permissible current.

To provide thermal protection for the double-fed asynchronous machine and the associated converter, it is necessary to limit the amount of the current. In that respect it is immaterial whether this involves an active current or a reactive current. Accordingly the maximum permissible current represents an apparent current. It is thus particularly simple to ascertain a maximum permissible apparent power, using a simplified model, from the maximum permissible apparent current. Such an embodiment is particularly universal. It can be used irrespective of whether an active power priority or a reactive power priority is specified, or whether a given ratio of active and reactive power, that is to say a power factor, is predetermined.

In accordance with a further preferred embodiment of the present invention when specifying an active power priority the maximum permissible reference value of the active power to be output or input is determined from the maximum permissible apparent power and a correction active power and the maximum permissible reference value of the reactive power to be output or input is determined from the actual value of the output or input active power, the correction active power and a correction reactive power.

The maximum permissible apparent power is determined by means of a simplified model. For that reason in reality the maximum permissible apparent power can differ both upwardly or downwardly. Therefore when specifying an active power priority the maximum permissible reference value of the active power to be output or input should be ascertained not solely from the maximum permissible apparent power, but rather it is particularly advantageous to act on the maximum permissible apparent power with a correction active power. Now, when specifying an active power priority, for making optimum use of the installation, the maximum permissible reference value of the reactive power to be output or input is advantageously so determined that, having regard to the correction values for the active and reactive power, the maximum permissible apparent power is not exceeded. It will be clear in that respect that, to ascertain the maximum permissible reference value of the output or input reactive power, the actual value of the active power to be output or input is taken into consideration.

In accordance with a further preferred embodiment of the present invention when specifying a reactive power priority the maximum permissible reference value of the reactive power to be output or input is determined from the maximum permissible apparent power and a correction reactive power and the maximum permissible reference value of the active power to be output or input is determined from the actual value of the output or input reactive power, the correction reactive power and a correction active power.

In accordance with a further preferred embodiment of the present invention the correction active power is determined by means of an adaption law from the actual value and an approximation value for the output or input active power, wherein the approximation value comprises the sum of the fed-back correction active power and an active power which is ascertained by means of the simplified model of the double-fed asynchronous machine.

In accordance with a further preferred embodiment of the present invention the correction reactive power is determined by means of an adaption law from the actual value and an approximation value for the output or input reactive power, wherein the approximation value comprises the sum of the fed-back correction reactive power and an reactive power which is ascertained by means of the simplified model of the double-fed asynchronous machine.

The operation of ascertaining the correction values for active and reactive power is therefore preferably effected with an observer. The observer comprises a simple model with a suitable feedback which provides that the approximation values are brought into conformity with the measured system parameters. That conformity is achieved by means of an adaption law. The adaption law must be so selected that the adaption operation is effected in a stable fashion. Simple implementation for an adaption law is evaluation of the difference of the approximation value and the actual value by a regulator or a filter. The system parameters of the observer are active and reactive power. The simplified model calculates a model active and reactive power from the actual value of the current to be limited and the voltage. The feedback adds thereto a correction value for active power or reactive power in such a way that said sum is brought into conformity with the active and reactive power to be regulated and to be output or input.

In general it is assumed that the double-fed asynchronous machine is operated on a symmetrical three-phase network. That however is not always the case in practice. Due to asymmetries, besides the positive phase-sequence system, a negative phase-sequence system also occurs in voltages and currents. The measured currents and voltages which are required for regulation of the active and reactive power to be output or input or for implementing current limitation can be broken down into positive and negative phase-sequence systems by means of known methods. Such methods can be found for example in the dissertation by H Wrede, 'Beiträge zur Erhöhung von Versorgungssicherheit und Spannungsqualität in der Übertragung und Verteilung elektrischer Energie durch leistungselektronische Betriebsmittel' (*Means for Increasing Supply Security and Voltage Quality in the Transmission and Distribution of Electric Energy through Electric Power Equipment*) which was published in 2004 by Shaker Publishing.

The negative phase-sequence system component of the current leads to an additional thermal loading so that, in accordance with a further preferred embodiment of the present invention, the maximum permissible apparent power is determined from positive phase-sequence system parameters and the maximum permissible positive phase-sequence system component of the current is determined by reducing the maximum permissible current by the negative phase-sequence system component of the current actual value.

In accordance with a further preferred embodiment of the present invention instead of the actual value of the output or input active power the actual value of the output or input positive phase-sequence system active power is used and instead of the actual value of the output or input reactive power the actual value of the output or input positive phase-sequence system reactive power is used.

The total power of the fundamental mode components for a system without star point earthing is composed of the sum of four products, namely the product of the positive phase-sequence system components of current and voltage, the product of the negative phase-sequence system components of current and voltage, the product of the positive phase-sequence system component of the voltage and the negative phase-sequence system component of the current as well as the product of the negative phase-sequence system component of the voltage and the negative phase-sequence system component of the current. In particular the products of positive and negative phase-sequence system components can lead to problems in regard to power regulation and current limitation as alternating powers arise therefrom. With a fundamental mode frequency of 50 Hz those alternating powers involve a frequency of 100 Hz. The products which are formed only from negative phase-sequence system and positive phase-sequence system components respectively in contrast afford steady values in the steady-state situation. The positive phase-sequence system power is calculated by the overall power being reduced by the products of the positive and negative phase-sequence system components and the product of the negative phase-sequence system components.

In accordance with a further preferred embodiment of the present invention positive phase-sequence system parameters are used for ascertaining the active power and the reactive power by means of the simplified model of the double-fed asynchronous machine.

In accordance with a further preferred embodiment of the present invention the rotor current of the double-fed asynchronous machine is limited.

In accordance with a further preferred embodiment of the present invention the stator current of the double-fed asynchronous machine is limited.

In accordance with a further preferred embodiment of the present invention the active and reactive power of the stator of the double-fed asynchronous machine is regulated.

In accordance with a further preferred embodiment of the present invention the active and reactive power of the network to which the double-fed asynchronous machine is connected is regulated.

According to another aspect of the invention, the specified object is attained by, an apparatus for regulating the output or input active and reactive power of a double-fed asynchronous machine, wherein the apparatus has means for limiting a current of the double-fed asynchronous machine, wherein during operation of the double-fed asynchronous machine a maximum permissible reference value of the active power to be output or input and a maximum permissible reference value of the reactive power to be output or input is determined by the means on the basis of a model of the asynchronous machine from a maximum permissible current in such a way that the current is not exceeded.

The apparatus according to the invention can be for example a control device for actuation of the converter which is provided with interfaces for receiving measurement values and reference value presettings and one or more microcontrollers for evaluation of the interface signals and implementation of regulation.

In accordance with a preferred embodiment of the present invention the apparatus includes means for specifying a priority, wherein when specifying an active power priority firstly the maximum permissible reference value of the active power to be output or input is determined by the means and the maximum permissible reference value of the reactive power to be output or input is determined by the means in dependence on the reference value of the active power to be output or input, and wherein when specifying a reactive power priority firstly the maximum permissible reference value of the reactive power to be output or input is determined by the means and the maximum permissible reference value of the active power to be output or input is determined by the means in dependence on the maximum permissible reference value of the reactive power to be output or input.

In accordance with a further preferred embodiment of the present invention the means determine a maximum permissible apparent power using a simplified model of the double-fed asynchronous machine from the maximum permissible current.

In accordance with a further preferred embodiment of the present invention when specifying an active power priority the maximum permissible reference value of the active power to be output or input is determined by the means from the maximum permissible apparent power and a correction active power and the maximum permissible reference value of the reactive power to be output or input is determined by the means from the actual value of the output or input active power, the correction active power and a correction reactive power.

In accordance with a further preferred embodiment of the present invention when specifying a reactive power priority the maximum permissible reference value of the reactive power to be output or input is determined by the means from the maximum permissible apparent power and a correction reactive power and the maximum permissible reference value of the active power to be output or input is determined by the means from the actual value of the output or input reactive power, the correction reactive power and a correction active power.

In accordance with a further preferred embodiment of the present invention the correction active power is determined by means of an adaption unit from the actual value and an approximation value for the output or input active power, wherein the approximation value comprises the sum of the fed-back correction active power and an active power which is calculated by the means using the simplified model of the double-fed asynchronous machine.

In accordance with a further preferred embodiment of the present invention the correction reactive power is determined by means of an adaption unit from the actual value and an approximation value for the output or input reactive power, wherein the approximation value comprises the sum of the fed-back correction reactive power and an reactive power which is calculated by the means using the simplified model of the double-fed asynchronous machine.

In accordance with a further preferred embodiment of the present invention the maximum permissible apparent power is determined by the means from positive phase-sequence system parameters and the maximum permissible positive phase-sequence system component of the current is determined by means for reducing the maximum permissible current by the negative phase-sequence system component of the current actual value.

In accordance with a further preferred embodiment of the present invention the means, instead of the actual value of the output or input active power, use the actual value of the output or input positive phase-sequence system active power and the means, instead of the actual value of the output or input reactive power, use the actual value of the output or input positive phase-sequence system reactive power.

In accordance with a further preferred embodiment of the present invention the means for calculating the active power and the reactive power use the simplified model of the double-fed asynchronous machine.

In accordance with a further preferred embodiment of the present invention the rotor current of the double-fed asynchronous machine is limited.

In accordance with a further preferred embodiment of the present invention the stator current of the double-fed asynchronous machine is limited.

In accordance with a further preferred embodiment of the present invention the active and reactive power of the stator of the double-fed asynchronous machine is regulated.

In accordance with a further preferred embodiment of the present invention the active and reactive power of the network to which the double-fed asynchronous machine is connected is regulated.

BRIEF DESCRIPTION OF THE DRAWINGS

An embodiment of the present invention is described in greater detail hereinafter with reference to the drawings in which.

DETAILED DESCRIPTION OF A PREFERRED EMBODIMENTS

The present invention concerns regulation of the output or input active and reactive power of a double-fed asynchronous machine, wherein the current of the machine is limited. Hereinafter the invention is described using the example of limiting the rotor current of a double-fed asynchronous machine whose active and reactive power which is input or output to the network is regulated.

Figure 1:
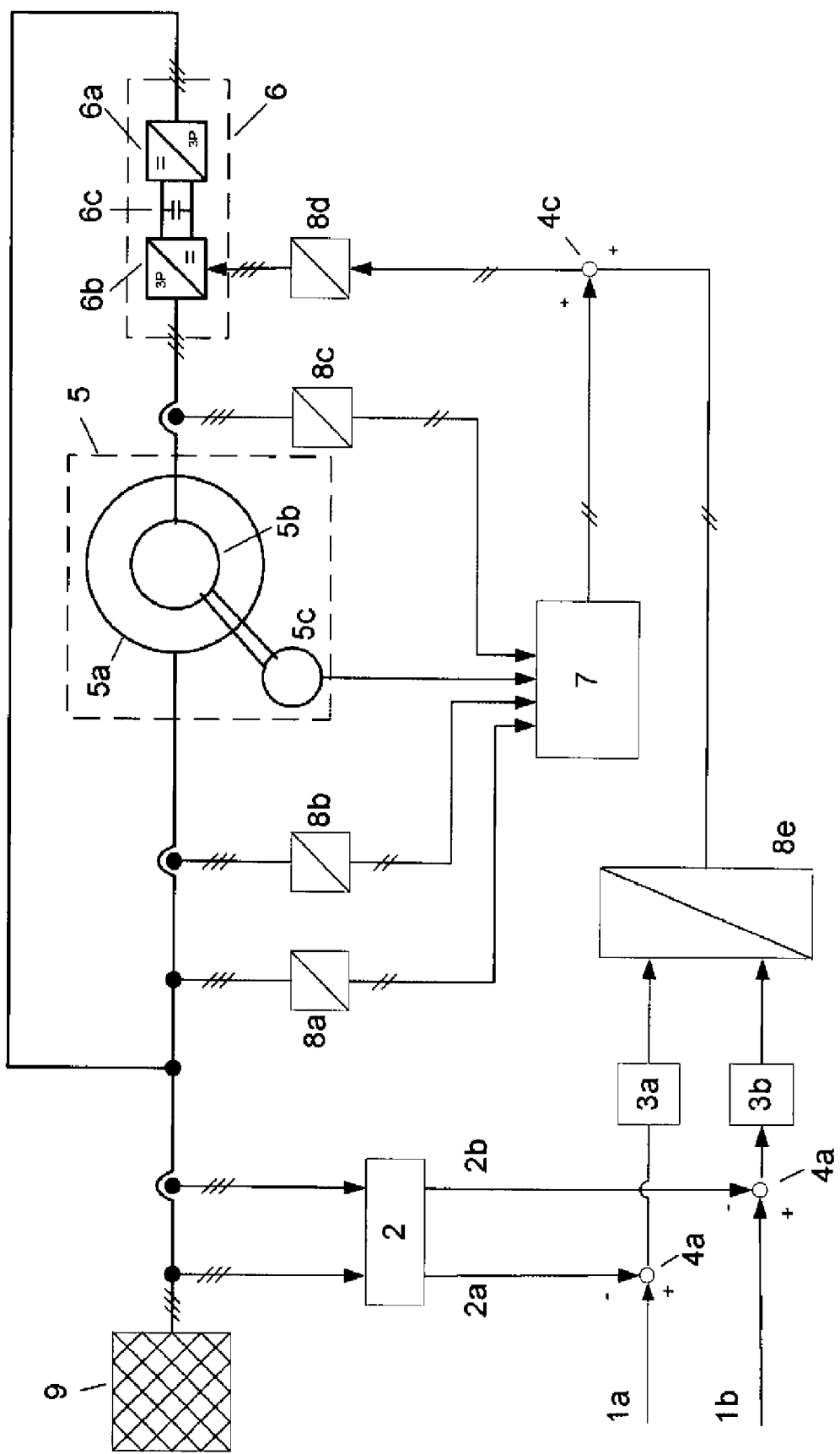
FIG. 1 shows a diagrammatic view of a regulating structure for regulating the output or input active and reactive power of the double-fed asynchronous machine without subordinate current regulators.

FIG. 1 shows a diagrammatic view of a double-fed asynchronous machine with the associated regulating technology. The asynchronous machine 5 comprises a stator 5a and a rotor 5b. The asynchronous machine also has a position sender 5c. A converter 6 is also necessary to operate the double-fed asynchronous machine. In the present case the converter comprises a network-side converter 6a and a machine-side converter 6b. The network-side and the machine-side converters are connected together by way of a dc voltage intermediate circuit 6c. The machine-side converter 6b is connected to the rotor 5b of the asynchronous machine by way of slip rings.

The stator 5a of the machine is connected to an electrical network 9 and the network-side converter 6a. The position sender 5c includes an evaluation unit (not shown). In that way both the rotor position and also the rotary rotor speed can be made available for the regulation operation. In alternative embodiments the rotor position and the rotor speed can also be determined from the electrical parameters of the asynchronous machine, that is to say without using a mechanical sensor.

The regulation system of the double-fed asynchronous machine receives a reference value for the active power 1a to be output or input, hereinafter referred to for brevity as the active power reference value, and a reference value for the reactive power 1b to be output or input, referred to hereinafter for brevity as the reactive power reference value. The diagrammatic view shown in FIG. 1 involves reference values for the active and reactive power input or output to the network. The actual value of the network active power 2a and the actual value of the network reactive power 2b are determined with the power calculation module 2 from the actual values of the network currents and the network voltages. The active power reference value 1a and the negative active power actual value 2a are passed to the adding means 4a and afford a reference parameter difference. In a corresponding fashion the reactive power reference value 1b and the negative reactive power actual value 2b are passed to the adding means 4b to determine a reference parameter difference. The corresponding reference parameter differences are passed to the active power regulator 3a and the reactive power regulator 3b.

An essential constituent part of power regulation without subordinate current regulators is model-based feedback. That is calculated by the feedback unit 7. The feedback unit 7 receives the stator voltage, the stator current and the rotor current, in which respect the three-phase measured variables are transformed into a two-phase co-ordinate system by means of the transformation units 8a-c. The two-phase co-ordinate system can be both a winding-fixed and also a rotating co-ordinate system. Depending on the respective nature of the feedback only a part of those variables is required. In addition generally the rotary speed of the machine is required for the feedback operation. For that purpose the rotary speed is transferred to the feedback unit 7 from the evaluation unit of the position sender. The outputs of the power regulators 3a and 3b are subjected to the action of the output of the feedback unit by the adding means 4c. Depending on the respective nature of the co-ordinate systems used the outputs of the power regulators are previously transformed into the corresponding co-ordinate system by means of the feedback unit 8e. The sum of the adding means 4c, after transformation into three-phase natural co-ordinates by means of the transformation unit 8d, forms the setting signal for the machine-side converter.

Figure 2:
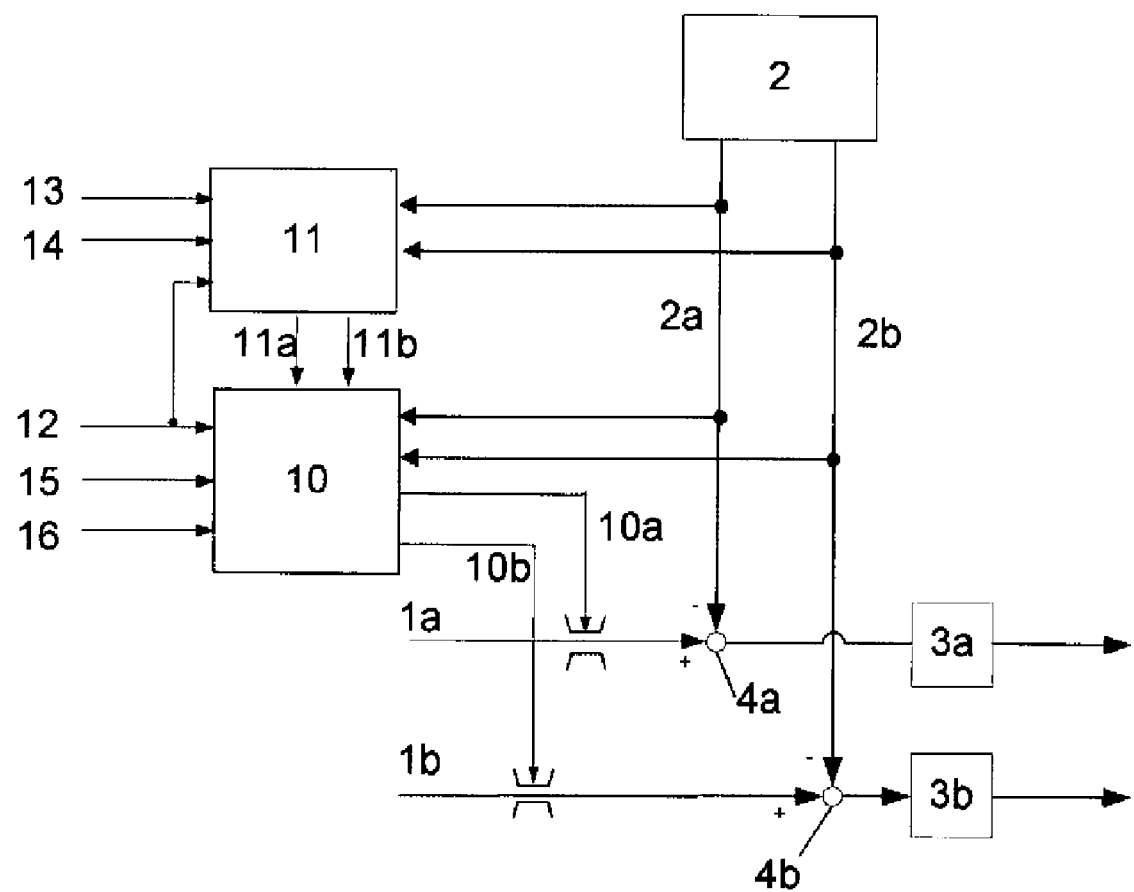
FIG. 2 shows a diagrammatic view of a method according to the invention of determining the maximum permissible reference values of the active and reactive power to be output or input.

FIG. 2 shows a diagrammatic view of a method according to the invention of determining the maximum permissible reference values of the output or input active and reactive power. In this respect the active power reference value 1a is limited to the maximum permissible reference value of the output or input active power 10a. As also shown in FIG. 1 the limited active power reference value is then acted upon with the negative actual value of the active power 2a by means of the adding means 4a and passed to the active power regulator 3a. In a corresponding fashion the reactive power reference value 1b is limited to the maximum permissible reference value of the output or input reactive power 10b, acted upon with the negative actual value of the reactive power by means of the adding means 4b and fed to the reactive power regulator 3b.

The maximum permissible reference values for active and reactive power are ascertained by means of the current limiting unit 10. The current limiting unit 10 can predetermine an active power priority or a reactive power priority. Irrespective of the priority a maximum permissible apparent power $S_{max}$ is calculated by means of the current limiting unit in accordance with equation (1):

$$S_{max} = \sqrt{3} \cdot U_{Gen} \cdot w_{21} \cdot I_{Rot,max} \qquad (1)$$

In that equation $U_{Gen}$ denotes the value of the generator voltage 15 and $I_{Rot,max}$ denotes the maximum permissible rotor current 16. The effective transformation ratio $w_{21}$ is a parameter of the simplified model.

When specifying an active power priority the maximum permissible reference value of the output or input active power 10a $P_{max}$ is calculated from equation (2) and the maximum permissible reference value of the output or input reactive power 10b $Q_{max}$ is calculated from equation (3):

$$P_{max} = S_{max} \cdot (1-s) + P_0 \qquad (2)$$

$$Q_{max} = \frac{\sqrt{(P_{max}-P_0)^2 - (P_{actual}-P_0)^2}}{(1-s)} + Q_0 \qquad (3)$$

In the above equations $P_0$ is the correction active power 11a and $Q_0$ is the correction reactive power 11b, which are transmitted to the current limiting unit 10 by the correction unit 11. The actual value of the input or output active power 2a $P_{actual}$ is transmitted to the current limiting unit 10 by the power calculation module 2. The parameter s is the slip 12 which must also be made available to the current limiting unit.

When specifying a reactive power priority the maximum permissible reference value of the output or input reactive power 10b $Q_{max}$ is calculated from equation (4) and the maximum permissible reference value of the output or input active power 10a $P_{max}$ is calculated from equation (5):

$$Q_{max} = S_{max} + Q_0 \qquad (4)$$

$$P_{max} = \sqrt{(Q_{max}-Q_0)^2 - (Q_{actual}-Q_0)^2} \cdot (1-s) + P_0 \qquad (5)$$

In addition to the above-described parameters there is here also the actual value of the output or input reactive power 2b $Q_{actual}$ which similarly to the active power actual value is transmitted to the current limiting unit 10 by the power calculation module 2.

The actual values of the output or input active power 2a and reactive power 2b are transmitted to the correction unit 11 for ascertaining the correction active power 11a and the correction reactive power 11b. In addition the slip 12 and the actual values of the generator voltage 13 and the rotor current 14 are fed to the correction unit. The mode of operation of the correction unit is shown in greater detail in FIGS. 3 and 4.

Figure 3:
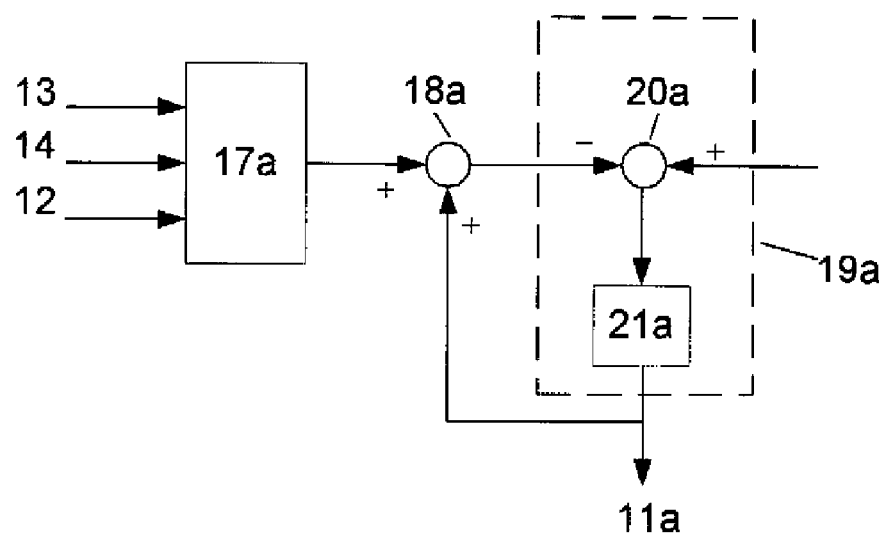
FIG. 3 shows a diagrammatic view of a method of ascertaining the correction active power.

FIG. 3 shows a diagrammatic view of a method of ascertaining the correction active power 11a. The generator voltage 13, the rotor current 14 and the slip 12 are fed to the calculation unit 17a. In the described embodiment the generator voltage and the rotor current are represented in a windings-fixed two-phase co-ordinate system. The generator voltage is thus described by the components $U_{Gen,\alpha}$ and $U_{Gen,\beta}$. The rotor current comprises the components $I_{Rot,\alpha}$ and $I_{Rot,\beta}$. Accordingly the active power $P_{model}$ is calculated from the simplified model:

$$P_{model} = (1-s) \cdot w_{21} \cdot (U_{Gen,\alpha} \cdot I_{Rot,\alpha} + U_{Gen,\beta} \cdot I_{Rot,\beta}) \qquad (6)$$

The model active power $P_{model}$ forms the output of the calculation unit 17a. The model active power is acted upon with the fed-back correction active power 11a by means of the adding means 18a and affords an approximation value for the input or output active power. The approximation value and the active power actual value 2a are fed to the adaption unit 19a and the correction active power 11a is determined by means of an adaption law. The adaption operation is effected by an adding means 20a and a regulator 21a. The adding means 20a ascertains the input value for the regulator from the negative approximation value and the active power actual value. The output value of the regulator 21a forms the correction active power 11a.

Figure 4:
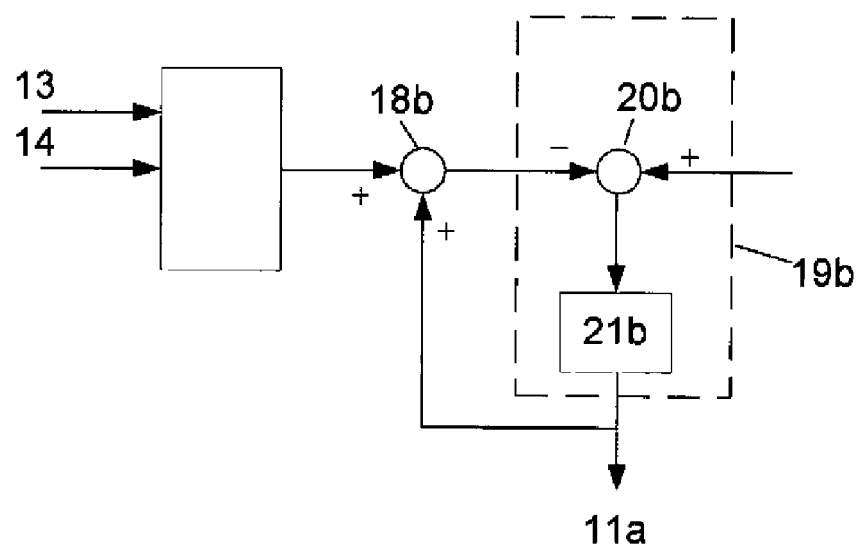
FIG. 4 shows a diagrammatic view of a method of ascertaining the correction reactive power.

FIG. 4 shows a corresponding diagrammatic view of a method of ascertaining the correction reactive power. The calculation unit 17b determines a model reactive power $Q_{model}$ from the generator voltage 13 and the rotor current 14. The model reactive power is calculated in a windings-fixed two-phase co-ordinate system in accordance with equation (7):

$$Q_{model} = w_{21} \cdot (-U_{Gen,\alpha} \cdot I_{Rot,\beta} + U_{Gen,\beta} \cdot I_{Rot,\alpha}) \qquad (7)$$

The model reactive power is acted upon with that of the fed-back correction reactive power by the adding means 18b and affords an approximation value for the input or output reactive power. The adding means 20b, from the negative approximation value and the reactive power actual value 2b, ascertains a difference which is fed to the regulator 21b. The output of the regulator is the correction reactive power 11b. The adding means 20b and the regulator 21b form the adaption unit 19b.

The described embodiment operates reliably only in the situation involving operation of the double-fed asynchronous machine on a symmetrical three-phase network. It is however possible to take account of asymmetries. For that purpose the measurement parameters are broken down into positive and negative phase-sequence systems.

The maximum permissible rotor current 16 which is made available to the current limiting unit 10 is then replaced by the maximum permissible positive phase-sequence system component of the rotor current $I_{Rot,max,positive}$. That positive phase-sequence component is afforded from the maximum permissible rotor current $I_{Rot,max}$ and the negative phase-sequence component of the rotor current actual value $I_{Rot,negative}$ $$I_{Rot,max,positive} = \sqrt{I_{Rot,max}^2 - I_{Rot,negative}^2} \qquad (8)$$

The actual values for the input or output power 2a and reactive power 2b are replaced both for the current limiting unit 10 and also for the correction unit 11 by the positive phase-sequence system components of the actual values.

Positive phase-sequence system components of generator voltage and rotor current are used for calculation of the model active and reactive power:

$$P_{model} = (1-s) \cdot w_{21} \cdot (U_{Gen,\alpha,positive} \cdot I_{Rot,\alpha,positive} + U_{Gen,\beta,positive} \cdot I_{Rot,\beta,positive}) \qquad (9)$$

$$Q_{model} = w_{21} \cdot (-U_{Gen,\alpha,positive} \cdot I_{Rot,\beta,positive} + U_{Gen,\beta,positive} \cdot I_{Rot,\alpha,positive}) \qquad (10)$$

The described enlargement of the method according to the invention means that the protection concept can also be used in relation to asymmetries in the electrical network.

The method can also be similarly used for limiting the stator current of the double-fed asynchronous machine. Furthermore it can be used if the active and reactive power of the stator is regulated.

What is claimed is:

1. A method of limiting a current in a double-fed asynchronous machine having an active power and a reactive power using reference values for the active power and the reactive power comprising the steps of:
   calculating maximum permissible power reference values for the active power and the reactive power such that a predetermined maximum permissible limit value of the current is not exceeded during operation of the double-fed asynchronous machine, using a predetermined maximum permissible limit value of the current and a model of the asynchronous machine and providing a power priority for the calculated maximum permissible power reference values, said active and reactive powers being either input powers or output powers; and
   regulating the active power and the reactive power so that the calculated maximum permissible power reference values are not exceeded,
   said calculation step providing active power priority by determining the maximum permissible reference value of the active power and determining the maximum permissible reference value of the reactive power using the maximum permissible reference value of the active power,
   said calculation step providing reactive power priority by determining the maximum permissible reference value of the reactive power and determining the maximum permissible reference value of the active power using the maximum permissible reference value of the reactive power.

2. The method of claim 1 wherein the rotor current of the double-fed asynchronous machine is limited.

3. The method of claim 1 wherein the stator current of the double-fed asynchronous machine is limited.

4. The method of claim 1 wherein the active and reactive power of the stator of the double-fed asynchronous machine is regulated.

5. The method of claim 1 wherein the active and reactive power of the network to which the double-fed asynchronous machine is connected is regulated.

6. The method of claim 1 further comprising the steps of:
   determining a respective correction power value for a respective calculated maximum permissible power reference value using at least one actual value of the current having the predetermined maximum permissible current limit; and
   correcting the respective calculated maximum permissible power reference value using the respective correction power value.

7. The method of claim 6 further comprising the steps of:
   determining an approximation value for the active power value, said approximation value being a sum of the fedback active correction power and an active power value determined using a simplified model of the double-fed asynchronous machine; and
   determining an active correction power value by means of an adaption law using an actual value of the active power and the approximation value for the active power value.

8. The method of claim 7 wherein the active power and the reactive power are determined by means of a simplified model of the double-fed asynchronous machine using positive phase-sequence system parameters.

9. The method of claim 6 further comprising the steps of:
   determining an approximation value for the reactive power value, said approximation value being a sum of the fedback reactive correction power and a reactive power value determined using a simplified model of the double-fed asynchronous machine; and
   determining a reactive correction power value by means of an adaption law using an actual value of the reactive power and the approximation value for the reactive power value.

10. The method of claim 9 wherein the active power and the reactive power are determined by means of a simplified model of the double-fed asynchronous machine using positive phase-sequence system parameters.

11. The method of claim 6 wherein instead of the actual value of the active power the actual value of the positive phase-sequence system active power is used and instead of the actual value of the reactive power the actual value of the positive phase-sequence system reactive power is used.

12. The method of claim 1 further comprising the step of:
    determining a maximum permissible apparent power using the maximum permissible current and a simplified model of the double-fed asynchronous machine.

13. The method of claim 12 wherein the maximum permissible apparent power is determined using positive phase-sequence system parameters and the maximum permissible positive phase-sequence system component of the current is determined by reducing the maximum permissible current by the negative phase-sequence system component of the actual current value.

14. The method of claim 1 further comprising the steps of:
    determining a maximum permissible apparent power using the maximum permissible current and a simplified model of the double-fed asynchronous machine;
    determining an active correction power value for the calculated maximum permissible active power reference value using at least one actual value of the current having the predetermined maximum permissible current limit; and
    determining a reactive correction power value for the maximum permissible reactive power reference value using at least one actual value of the current having the predetermined maximum permissible current limit,
    wherein the calculated maximum permissible reference value of the active power is determined with active power priority using the maximum permissible apparent power and the active correction power value, and the calculated maximum permissible reference value of the reactive power is determined using the actual value of the active power value, the active correction power value and the reactive correction power value.

15. The method of claim 1 wherein the calculation step includes the steps of:
    determining a maximum permissible apparent power using the maximum permissible current and a simplified model of the double-fed asynchronous machine;
    determining an active correction power value for the maximum permissible active power reference value using at least one actual value of the current having the predetermined maximum permissible current limit; and
    determining a reactive correction power value for the maximum permissible reactive power reference value using at least one actual value of the current having the predetermined maximum permissible current limit,
    wherein the maximum permissible reference value of the reactive power is determined with reactive power priority using the maximum permissible apparent reactive power and the reactive correction power, and the maximum permissible reference value of the active power is determined using the actual value of the reactive power, the reactive correction power value and the active correction power value.

16. Apparatus for limiting a current in a double-fed asynchronous machine having an active power and a reactive power using reference values for the active power and the reactive power, comprising:
   means for calculating maximum permissible power reference values for the active power and the reactive power such that a predetermined maximum permissible limit value of the current is not exceeded during operation of the double-fed asynchronous machine, using a predetermined maximum permissible limit value of the current and a model of the asynchronous machine and providing a power priority for the calculated maximum permissible power reference values, said active and reactive powers being either input powers or output powers; and
   means for regulating the active power and the reactive power so that the calculated maximum permissible power reference values are not exceeded,
   said means for calculating maximum permissible power reference values providing active power priority by determining the maximum permissible reference value of the active power and determining the maximum permissible reference value of the reactive power using the maximum permissible reference value of the active power,
   said calculation step providing reactive power priority by determining the maximum permissible reference value of the reactive power and determining the maximum permissible reference value of the active power using the maximum permissible reference value of the reactive power.

17. The apparatus of claim 16 wherein the rotor current of the double-fed asynchronous machine is limited.

18. The apparatus of claim 16 wherein the stator current of the double-fed asynchronous machine is limited.

19. The apparatus of claim 16 wherein the active and reactive power of the stator of the double-fed asynchronous machine is regulated.

20. The apparatus of claim 16 wherein the active and reactive power of the network to which the double-fed asynchronous machine is connected is regulated.

21. The apparatus of claim 16 further comprising:
   means for determining a respective correction power value for a respective calculated maximum permissible power reference value using at least one actual value of the current having the predetermined maximum permissible current limit; and
   means for correcting the respective calculated maximum permissible power reference value using the respective correction power value.

22. The apparatus of claim 21 further comprising:
   means for determining an approximation value for the active power value, said approximation value being a sum of the fed-back active correction power and an active power value determined using a simplified model of the double-fed asynchronous machine; and
   means for determining an active correction power value by means of an adaption law using an actual value of the active power and the approximation value for the active power value.

23. The apparatus of claim 22 wherein the means for determining the active power and the reactive power determines the active power and the reactive power by means of a simplified model of the double-fed asynchronous machine using positive phase-sequence system parameters.

24. The apparatus of claim 21 further comprising:
   means for determining an approximation value for the reactive power value, said approximation value being a sum of the fed-back reactive correction power and a reactive power value determined using a simplified model of the double-fed asynchronous machine; and
   means for determining a reactive correction power value by means of an adaption law using an actual value of the reactive power and the approximation value for the reactive power value.

25. The apparatus of claim 24 wherein the means for determining the active power and the reactive power determines the active power and the reactive power by means of a simplified model of the double-fed asynchronous machine using positive phase-sequence system parameters.

26. The apparatus of claim 21 wherein instead of the actual value of the active power the actual value of the positive phase-sequence system active power is used and instead of the actual value of the reactive power the actual value of the positive phase-sequence system reactive power is used.

27. The apparatus of claim 16 further comprising:
   means for determining a maximum permissible apparent power using the maximum permissible current and a simplified model of the double-fed asynchronous machine.

28. The apparatus of claim 27 wherein the maximum permissible apparent power is determined using positive phase-sequence system parameters, further comprising:
   means for determining the maximum permissible positive phase-sequence system component of the current is determined by reducing the maximum permissible current by the negative phase-sequence system component of the actual current value.

29. The apparatus of claim 16 further comprising:
   means for determining a maximum permissible apparent power using the maximum permissible current and a simplified model of the double-fed asynchronous machine;
   means for determining an active correction power value for the calculated maximum permissible active power reference value using at least one actual value of the current having the predetermined maximum permissible current limit; and
   means for determining a reactive correction power value for the maximum permissible reactive power reference value using at least one actual value of the current having the predetermined maximum permissible current limit,
   wherein the calculation means determines the calculated maximum permissible reference value of the active power with active power priority using the maximum permissible apparent power and the active correction power value, and determines the calculated maximum permissible reference value of the reactive power using the actual value of the active power value, the active correction power value and the reactive correction power value.

30. The apparatus of claim 16 further comprising:
   means for determining a maximum permissible apparent power using the maximum permissible current and a simplified model of the double-fed asynchronous machine;
   means for determining an active correction power value for the maximum permissible active power reference value using at least one actual value of the current having the predetermined maximum permissible current limit; and means for determining a reactive correction power value for the maximum permissible reactive power reference value using at least one actual value of the current having the predetermined maximum permissible current limit, wherein the calculation means determines the calculated maximum permissible reference value of the reactive power with reactive power priority using the maximum permissible apparent reactive power and the reactive correction power, and the maximum permissible reference value of the active power is determined using the actual value of the reactive power, the reactive correction power value and the active correction power value.

* * * * *

UNITED STATES PATENT AND TRADEMARK OFFICE
CERTIFICATE OF CORRECTION

| | | |
|---|---|---|
| PATENT NO. | : 8,242,753 B2 | Page 1 of 1 |
| APPLICATION NO. | : 12/304369 | |
| DATED | : August 14, 2012 | |
| INVENTOR(S) | : Stephan Engelhardt and Andrzej Geniusz | |

It is certified that error appears in the above-identified patent and that said Letters Patent is hereby corrected as shown below:

Title Page, Item [73] Assignee:

Delete "WOODWARD SEG GMBH&CO KG" and insert --WOODWARD KEMPEN GMBH--.

Signed and Sealed this
Eighteenth Day of September, 2012

David J. Kappos
*Director of the United States Patent and Trademark Office*